(12) United States Patent
Wendt et al.

(10) Patent No.: US 10,539,994 B2
(45) Date of Patent: Jan. 21, 2020

(54) RAPID RESUMPTION OF A POWER SUPPLY VIA A DATA LINK AFTER POWER OUTAGE

(71) Applicant: SIGNIFY HOLDING B.V., Eindhoven (NL)

(72) Inventors: Matthias Wendt, Würselen (DE); Robert Woudenberg, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 50 days.

(21) Appl. No.: 15/557,236

(22) PCT Filed: Feb. 26, 2016

(86) PCT No.: PCT/EP2016/054056
§ 371 (c)(1),
(2) Date: Sep. 11, 2017

(87) PCT Pub. No.: WO2016/142188
PCT Pub. Date: Sep. 15, 2016

(65) Prior Publication Data
US 2018/0052504 A1 Feb. 22, 2018

(30) Foreign Application Priority Data
Mar. 11, 2015 (EP) .................... 15158625

(51) Int. Cl.
*G06F 1/30* (2006.01)
*G06F 1/24* (2006.01)
(Continued)

(52) U.S. Cl.
CPC ............... *G06F 1/305* (2013.01); *G06F 1/24* (2013.01); *G06F 1/28* (2013.01); *G06F 1/3206* (2013.01)

(58) Field of Classification Search
CPC ... G06F 1/305; G06F 1/24; G06F 1/28; G06F 1/3206
(Continued)

(56) References Cited

U.S. PATENT DOCUMENTS 8,793,511 B1 * 7/2014 Bishara .................. G06F 1/266
713/300
10,061,599 B1 * 8/2018 Yakovlev ............ G06F 9/44505
(Continued)

FOREIGN PATENT DOCUMENTS

JP 2016100900 A 5/2016
WO 2010036787 A1 4/2010

*Primary Examiner* — Kim Huynh
*Assistant Examiner* — Sumil M Desai
(74) *Attorney, Agent, or Firm* — Meenakshy Chavravorty

(57) ABSTRACT

The invention relates to an apparatus (1) enabled to provide power to a powered device (2) via a wired data link (3). The apparatus (1) is configured to provide the power to the powered device (2) in accordance with a configuration determined based on at least one parameter transmitted by the powered device (2) via the wired data link (3) in a power cycle. Further, the apparatus (1) comprises a memory (12) for storing an information about the configuration and a controller (10) for controlling the apparatus (1) on the basis of the stored information to provide power in accordance with the same configuration to the powered device (12) in a subsequent power cycle after a power outage. Moreover, the invention relates to a method for operating the apparatus (1).

13 Claims, 5 Drawing Sheets

(51) Int. Cl.
*G06F 1/28* (2006.01)
*G06F 1/3206* (2019.01)

(58) Field of Classification Search
USPC .......................................................... 713/340
See application file for complete search history.

(56) References Cited

U.S. PATENT DOCUMENTS

| | | | |
|---|---|---|---|
| 2006/0092000 A1* | 5/2006 | Karam | H04L 12/10 713/300 |
| 2007/0118772 A1 | 5/2007 | Diab | |
| 2009/0217062 A1 | 8/2009 | Diab | |
| 2009/0327766 A1* | 12/2009 | Ghoshal | G06F 1/266 713/300 |
| 2010/0083022 A1* | 4/2010 | Diab | H04L 12/40045 713/340 |
| 2011/0154086 A1 | 6/2011 | Picard et al. | |
| 2014/0119381 A1 | 5/2014 | Diab et al. | |

* cited by examiner

RAPID RESUMPTION OF A POWER SUPPLY VIA A DATA LINK AFTER POWER OUTAGE

CROSS-REFERENCE TO PRIOR APPLICATIONS

This application is the U.S. National Phase application under 35 U.S.C. § 371 of International Application No. PCT/EP2016/054056, filed on Feb. 26, 2016, which claims the benefit of European Patent Application No. 15158625.2, filed on Mar. 11, 2015. These applications are hereby incorporated by reference herein.

FIELD OF THE INVENTION

The invention relates to a power supply of a powered device via wired data link. More specifically, the invention is related to an apparatus enabled to provide power to a powered device via a wired data link for connecting the apparatus and the powered device. Moreover, the invention is related to a method for operating the apparatus and to a computer program for causing a processing unit of the apparatus to carry out the method.

BACKGROUND OF THE INVENTION

In order to facilitate the power supply of electrical devices exchanging data with further equipment, mechanisms have been developed that allow for supplying the electrical devices with power via the same wired links which are used for the data exchange. In accordance with such mechanisms, power may be carried on the same conductors of the wired links as the data, or power may be carried on dedicated conductors in the same cable. Thus, it is not necessary to provide additional cabling for supplying power to the electrical devices.

One such mechanism is known as Power over Ethernet (PoE) and is described in the IEEE standard 802.3af-2003. The PoE mechanism allows for passing electrical power from a so called power sourcing equipment (PSE) to a powered device (PD) on the same Ethernet link that is also used for exchanging data between the PSE and the PD. Examples of powered devices which may be supplied with power by means of the PoE mechanism include classical network devices, such as IP phones, IP cameras, wireless access points and network routers. Moreover, solutions extending the PoE mechanism to other devices than such classical network devices have been suggested and developed. One related example includes the use of the PoE mechanism for powering and controlling lighting equipment connected to a lighting network via Ethernet connections.

Usually, powered devices which can be supplied with power via a data link have different power requirements particularly depending on the maximum power that such powered devices consume. In this regard, several classes of powered devices are defined in the aforementioned PoE mechanism, where each class corresponds to a certain current and power range. In order to provide an appropriate amount of power to the powered device, the apparatus has to determine the power requirements of the powered device. For this purpose, the apparatus usually reads a parameter specifying the power requirement from the powered device during a first period of a power cycle during which only a small voltage is provided to the powered device and which is also referred to a probing phase herein. In the context of the PoE mechanism, the parameter specifies the class of the powered device. On the basis of the parameter read from the powered device during the probing phase, the apparatus determines the appropriate configuration for the powered device. Then, it provides power to the powered device in accordance with the determined configuration in the normal mode of operation.

The aforementioned determination of the appropriate configuration for the powered device is made at the beginning of each power cycle, i.e. each time the apparatus switches from an inactive state in which no power is supplied to a powered device to an active state in which the apparatus supplies power to a powered device. Hereby, it is ensured that the apparatus always provides an appropriate amount of power to the connected powered device. In particular, it is ensured that an appropriate amount of power is supplied to a powered device which is newly connected to the apparatus before the start of the power cycle.

SUMMARY OF THE INVENTION

Therefore, it is an object of the present invention to allow for a faster start-up of the powered device upon an interruption of the power supply via a data link by an apparatus connected to the powered device. There is not always connected a new powered device to the apparatus before the beginning of each power cycle. Rather, the same powered device may be connected to the apparatus as in the preceding power cycle. This is particularly true, when a power cycle starts upon a short power outage, which may e.g. be due to a failure of the power supply of the apparatus. In such cases, the probing phase leads to an unnecessary delay in the start up of the powered device.

In a first aspect of the invention, an apparatus is suggested which is enabled to provide power to a powered device via a wired data link for connecting the apparatus and the powered device. The apparatus is configured to provide the power to the powered device in accordance with a configuration determined based on at least one parameter transmitted by the powered device via the wired data link during a power cycle, and the apparatus comprises a memory for storing an information about the configuration and a controller for controlling the apparatus on the basis of the stored information to provide power in accordance with the same configuration to the powered device in a subsequent power cycle after a power outage.

By storing the configuration for providing power to the powered device in the memory and by controlling the apparatus to provide power to the powered device based upon the stored configuration after a power outage, a probing phase can be dispensed with at the beginning of the power cycle following the power outage. Thus, a faster start-up of the powered device can be achieved after the power outage.

The configuration for providing power to the powered device may particularly include a specific range of currents provided to the powered device and/or a specific range of the power provided to the powered device, for example. The parameter transmitted by the powered device via the wired data link may be any parameter specifying the configuration. For instance it may include an indication specifying the specific range of currents or the range of power to be provided to the powered device. In order to store the configuration in the memory, the parameter or another indication identifying the configuration may be written to the memory.

In one embodiment, the wired data link includes an Ethernet link. In a related embodiment, the apparatus is configured to provide power to the powered device in accordance with a Power over Ethernet (PoE) mechanism. In this case, the aforementioned parameter may be a power class in accordance with the PoE specification. However, the invention may likewise be applied in connection with other wired data links, such as, for example, USB (Universal Serial Bus) data links.

Preferably, the controller does only control the apparatus to provide power to the powered device in accordance with the stored configuration after a power outage, if an additional criterion is fulfilled. In particular, this criterion may be selected such that it is ensured or at least likely that the powered device connected to the apparatus before the power outage has not been replaced by a new powered device during the power outage. If the criterion is not fulfilled, i.e. if it is at least likely that the powered device has been replaced during the power outage, the apparatus may not be controlled to provide power in accordance with the stored configuration after power outage. Rather, the apparatus may begin the new power cycle following the power outage with a probing phase in order to ensure that power is provided to the new device in an appropriate manner.

In an embodiment, the apparatus further comprises a connection monitoring means for detecting an interruption of the connection between the apparatus and the powered device during the power outage. A related embodiment provides that the controller is configured to control the apparatus to provide power to the powered device on the basis of the stored information after the power outage, if the connection monitoring means has not detected an interruption of the connection between the apparatus and the powered device during the power outage.

In this case, it is at least unlikely that powered device has been replaced during the power outage, because the replacement of the powered device usually requires the interruption of the connection between the apparatus and the powered device. Therefore, it can be assumed that before and after the power outage the same powered device is connected to the apparatus and, thus, power can be supplied to the powered device in accordance with the stored configuration from the last power cycle after the power outage.

In an embodiment, the connection monitoring means comprises a power source to provide a test current flowing in a current loop through the wired data link and the powered device and the connection monitoring means comprises a memorizing means for memorizing an interruption of the current loop during the power outage. In a related embodiment, the controller is configured to control the apparatus to provide power to the powered device on the basis of the stored information after the power outage, if the memorizing means does not indicate an interruption of the current loop during the power outage.

These embodiments exploit the fact that the interruption of the current loop may be indicative of the interruption of the connection between the apparatus and the powered device. Thus, it can be assumed that the powered device has not been replaced during the power outage when the current loop is not interrupted during the power outage. Consequently, after the power outage, power can be provided in accordance with the stored configuration in this case.

The power source for providing the loop current in the aforementioned embodiments may comprise a capacitor being charged by means of the power provided by the apparatus to power the powered device. The memorizing means used in these embodiments may comprise a further capacitor being discharged in response to an interruption of the current loop. Further, in one implementation, the power source corresponds to the memorizing means. In particular, the connection monitoring module may comprise a capacitor which serves as power source and as memorizing means. This reduces the complexity of the connection monitoring means.

In an embodiment, the connection monitoring means comprises
  a push contact arranged at a socket for receiving a connector to establish the wired data link to the powered device, the push contact being in a first position when the connector is plugged into the socket and being in a second position when no connector is plugged into the socket, and
  a memorizing means for memorizing a movement of the push contact from the first to the second position and/or from the second to the first position during the power outage.

In a related embodiment, the controller is configured to control the apparatus to provide power to the powered device on the basis of the stored information after the power outage, if the memorizing means does not indicate a movement of the push contact from the first to the second position and/or from the second to the first position during the power outage.

These embodiments exploit the fact that the movement of the push contact from the first to the second position or vice versa may be indicative of the interruption of the connection between the apparatus and the powered device. Therefore, it can be assumed that the powered device has not been replaced during the power outage, if the memorizing means does not indicate such a movement. Hence, after the power outage, power can be provided in accordance with the stored configuration in this case.

The memorizing means used in the aforementioned embodiment may comprise a capacitor being discharged in response to a movement of the push contact from the first to the second position and/or in response to a movement of the push contact from the second to the first position. In particular, the push contact may be arranged to close a switch connecting the terminals of the capacitor when the push contact moves from the first to the second position and/or vice versa. Further, the capacitor may be charged by means of the power provided by the apparatus to power the powered device.

In a further aspect of the invention, a method for operating an apparatus enabled to provide power to a powered device via a wired data link for connecting the apparatus and the powered device is suggested. The method comprises:
  providing the power to the powered device in accordance with a configuration determined based on at least one parameter transmitted by the powered device via the wired data link in a power cycle,
  storing an information about the configuration in a memory of the apparatus; and
  controlling the apparatus on the basis of the stored information to provide power in accordance with the same configuration to the powered device in a subsequent power cycle following a power outage.

In a still further aspect, a computer program is suggested. The computer program is executable in a processing unit of a system as defined in claim 1, and the computer program comprises program code means for causing the processing unit to carry out a method as defined in claim 14.

It shall be understood that the apparatus of claim 1, the method of claim 14 and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
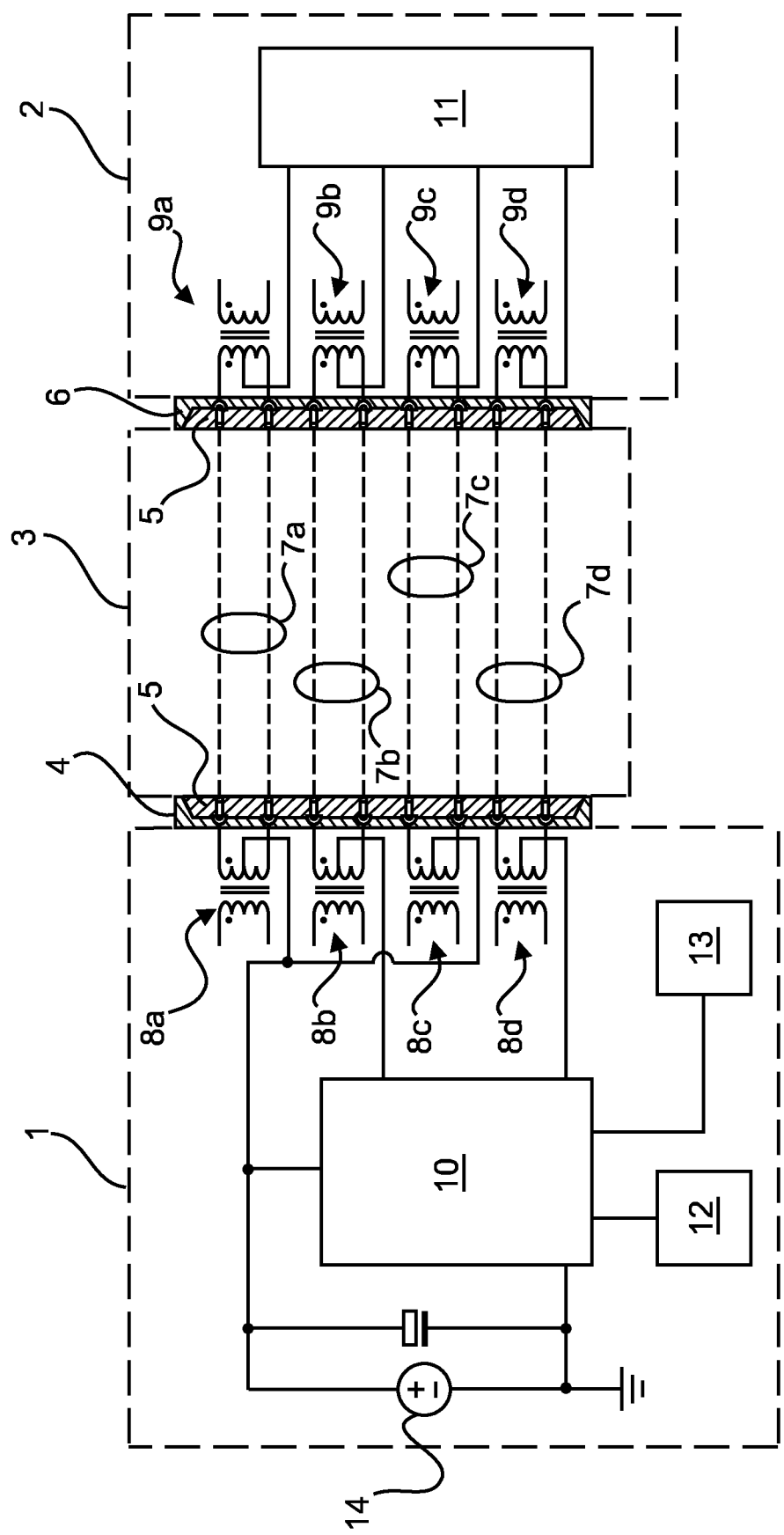
FIG. 1 shows schematically and exemplarily components of one embodiment of an apparatus that is enabled to provide power to a powered device and that comprises a connection monitoring module for monitoring a connection between the apparatus and the powered device.

FIG. 1 schematically and exemplarily shows components of an apparatus 1 configured as a power supplying equipment (PSE) enabled to supply power to a powered device (PD) 2 over an Ethernet cable 3. In particular, components of the PSE 1 are shown, which are used for operating one Ethernet port of the PSE 1. In addition, the PSE 1 may include one or more further Ethernet ports which are equipped in an analogue way.

For receiving one of the connectors 5 of the Ethernet cable 3, the port comprises a socket 4. The powered device 2 disposes of a corresponding socket 6 for receiving the other connector 2 of the Ethernet cable 3.

In the depicted embodiment, the Ethernet cable comprises four wire pairs 7i (i=a, . . . , d) for the transmission of data from the PSE 1 to the PD 2 and vice versa. For each of the wire pairs 7i, one data transformer 8i is provided in the PSE 1 and one corresponding data transformer 9i is provided in the PD 2. One side of each of the data transformers 8i, 9i, which is referred to herein as primary, is coupled to a respective data pair in the PSE 1 or the PD 2 (the data pairs are not shown in FIG. 1). The other side of each of the data transformers 8i, 9i, which is referred to herein as secondary, is connected to the wires of the corresponding wire pair 7i of the Ethernet cable 3. Using such a configuration, data can be transmitted from the PSE 1 to the PD 2 via the wire pairs 7i in accordance with the Ethernet standard in a way known to person skilled in the art as such.

For providing power from the PSE 1 to the PD 2 via the Ethernet cable 3, a so called phantom feeding technique is used in the center tabs of the data transformers 8i, 9i. In order to apply such a technique, the center tabs of the data transformers 8i of the PSE 1 are coupled to a power supply 14, which superimposes power onto the respective wire pairs 7i via these center tabs. In the PD 2, the power is derived from the wire pairs 7i via the center tabs of the corresponding two data transformers 9i in the PD 2. These center tabs are coupled to a further component 11 of the PD, which may be a DC to DC converter, for example, which may provide power to further components of the PD 2. In particular, two wire pairs 7a and 7c of the Ethernet cable 3 are coupled to the positive pole of the power supply 14 via the respective center tabs of the data transformers 8a and 8c of the PSE 1. The two other wire pairs 7b and 7d of the Ethernet cable 3 are used as power return paths; these wire pairs 7b and 7d are coupled to the negative pole of the power supply 14 and/or the ground potential.

For controlling the power supply of the PD 2 via the Ethernet cable 3, a port controller 10 is provided. The port controller 10 is particularly capable of determining whether a PD 2 is connected to the port and of controlling the power supply 14 such that a power is supplied to the PD 2 in accordance with a predetermined configuration. In so doing, the port controller 10 does preferably monitor the power connection to PD 2 in order to ensure its proper operation. In so doing, the port controller 10 may particularly check whether predetermined power and/or current ranges are exceeded. If so, the port controller 10 may interrupt the power supply to the PD 2 or may initiate other suitable Under the control of the port controller 10, power is particularly provided to the PD 2 in accordance with one of several possible configurations supported by the PSE 1. Each of these configurations may include a power range defining the power a PD 2 is to consume. In this respect, several classes of PDs 2 may be defined as described in the Ethernet specification, and each class may correspond to one configuration for providing power from the PSE 1 to a powered device 2. The PoE specification particularly defines four classes 0-4, and in these classes 0.44-12.96 W (class 0), 0.44-3.84 W (class 1), 3.84-6.49 W (class 3) and 6.49-12.96 W (class 4) should be provided to the PD 2. However, it is also possible to define further and/or other power classes for PDs 2.

In order to provide power to the PD 2 in accordance with the correct configuration, the port controller 10 may determine the appropriate configuration for a connected PD 2 in a probing phase at the beginning of a power cycle for providing power to the PD 2. In this probing phase, the port controller 10 may only supply a small voltage level to the PD 2 in order to avoid any damages of the PD 2. During the probing phase, the power controller 10 may firstly check whether a valid PD 2 is connected to the Ethernet port. In this process, which is also known as "line detection", the port controller 10 may seek a specific resistor as described in the PoE specification. Upon the detection of this signature resistor, which indicates that a valid PD 2 is connected, the power controller 10 may determine the appropriate configuration for providing power to the connected PD 2. For this purpose, the power controller may retrieve a parameter indicating the suitable configuration from the PD 2. This parameter may particularly specify one class of the aforementioned classes 0-4, to which the PD 2 is assigned. On the basis of the parameter retrieved from the PD 2, the power controller 10 may then determine the appropriate configuration for the connected PD 2. Thereafter, the normal operation of the PSE 1 and the PD 2 may be started and the PSE 1 may begin to provide the full power level to the PD 2 in accordance with the determined configuration.

During the normal operation, the port controller 10 may particularly monitor the connection to the PD 2 in order to detect a disconnection of the PD 2 from the PSE 1. For this purpose, the port controller 10 may monitor the current drawn by the PD 2 and may detect a disconnection of the PD 2, when the current stops flowing or falls below a predetermined threshold. When the port controller 10 detects that the PD 2 has been disconnected during a power cycle, it control the power supply 14 to stop supplying power via the data transformers 8i of the Ethernet port.

Conventionally, the probing phase described above is passed through at the beginning of each power cycle for providing power to a PD 2 via an Ethernet port, i.e. each time the PSE 1 starts to supply power via the Ethernet port upon an interruption of the power supply or for the first time. This is due to the possibility that one PD 2 may be disconnected from the Ethernet port and a new PD 2 may be connected during an interruption of the power supply. In these cases, the evaluations during the probing phase ensure that the PSE 1 provides power to the new PD 2 in accordance with the correct configuration appropriate for the new PD 2.

When the PD 2 connected to the PSE 1 is not replaced during a power outage, a determination of the power configuration for providing power to the PD 2 is effectively not necessary. In order to avoid such unnecessary determinations of the configuration for a PD 2 after a power outage, the PSE 1 comprises a memory 12 for storing the power configuration used in one power cycle during a power outage terminating this power cycle. When the power outage has ended and a new power cycle begins, the PSE 1 reads the stored configuration from the memory 12 and may immediately start to provide power via the Ethernet port in accordance with the stored configuration. A probing phase may be dispensed with. In the PSE 1, one memory 12 may be provided for each Ethernet port. This memory 12 may be connected to or integrated into the respective port controller 10 assigned to the relevant Ethernet port. For storing the configuration, a predetermined parameter specifying the configuration can be written the memory 12 during each power cycle, in which power is provide via the Ethernet port to which the memory is assigned. In particular, this parameter may specify the class of the PD 2 connected to the PSE 1 via the Ethernet port.

In order to avoid the use of the configuration from the previous power cycle in case the PD 2 has been replaced during the power outage, the PSE 1 preferably uses the stored configuration only when an additional criterion is fulfilled.

In one embodiment, the PSE 1 only uses the stored configuration, when the duration of the power outage does not exceed a predetermined threshold. The threshold may be selected such that a change of the PD 2 is unlikely in a time interval having a duration smaller than the threshold. In specific implementations, the threshold may be between 5 seconds and 20 seconds, for example.

In further embodiments, a connection monitoring module 13 is provided in the PSE 1 for each Ethernet port. The connection monitoring module 13 is connected to the port controller 10 and is capable of detecting an interruption of the connection between the PSE 1 and the PD 2 during a power outage. Moreover, the connection monitoring module 13 comprises a memorizing unit which is capable of memorizing a detected interruption of the connection between the PSE 1 and the PD 2.

Figure 2:
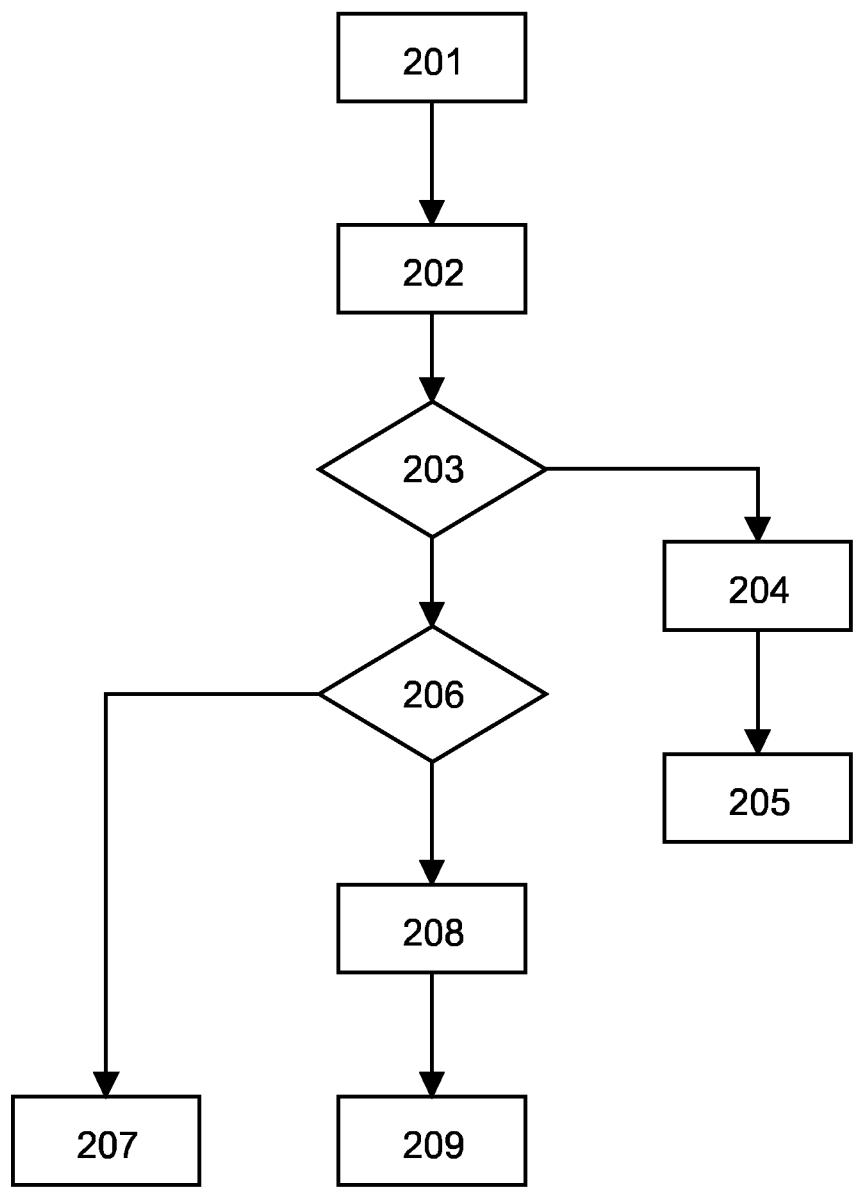
FIG. 2 shows schematically and exemplarily a diagram illustrating steps of the operation of the apparatus.

Steps of the operation of the PSE 1 at the beginning of a power cycle in connection with the use of the connection monitoring module 13 are schematically and exemplarily shown in FIG. 2: Upon the beginning of a new power cycle in step 201, the port controller 10 accesses the memorizing unit of the connection monitoring module 13 in step 202. Then, it checks whether the memorizing unit indicates that the connection monitoring module 13 has detected an interruption of the connection between the PSE 1 and the PD 2 during a power outage preceding the power cycle (step 203). If this is not the case, i.e. if the memorizing unit does not indicate an interruption of the connection between the PSE 1 and the PD 2 during the power outage, the power controller 10 reads the stored configuration from the previous power cycle from the memory 12 (step 204). Then, it controls the power supply 14 to provide power to the PD 2 via the Ethernet port in accordance with the stored and read configuration in step 205.

In case the port controller 10 determines in step 203 that the memorizing unit indicates a detection of an interruption of the connection between the PSE 1 and the PD 2 during the power outage, it starts the new power cycle with a probing phase during which only a small voltage level is supplied via the Ethernet port. As explained above, the power controller may firstly check in the probing phase, whether a valid PD 2 is connected to the PSE 1 via the Ethernet port (step 206). If the port controller 10 does not detect a valid PD 2 in step 206, it does not further provide power via the Ethernet port and terminates the power cycle (step 207). If the port controller 10 detects a valid PD 2 in step 206, it determines the suitable configuration for providing power to the connected PD 2 (step 208). As explained above, the port controller 10 may retrieve a parameter indicating the appropriate configuration from the PD 2 for this purpose. Thereupon, the port controller 10 controls the power supply 14 to provide power in accordance with the determined configuration to the PD 2 (step 209).

Figure 3A:
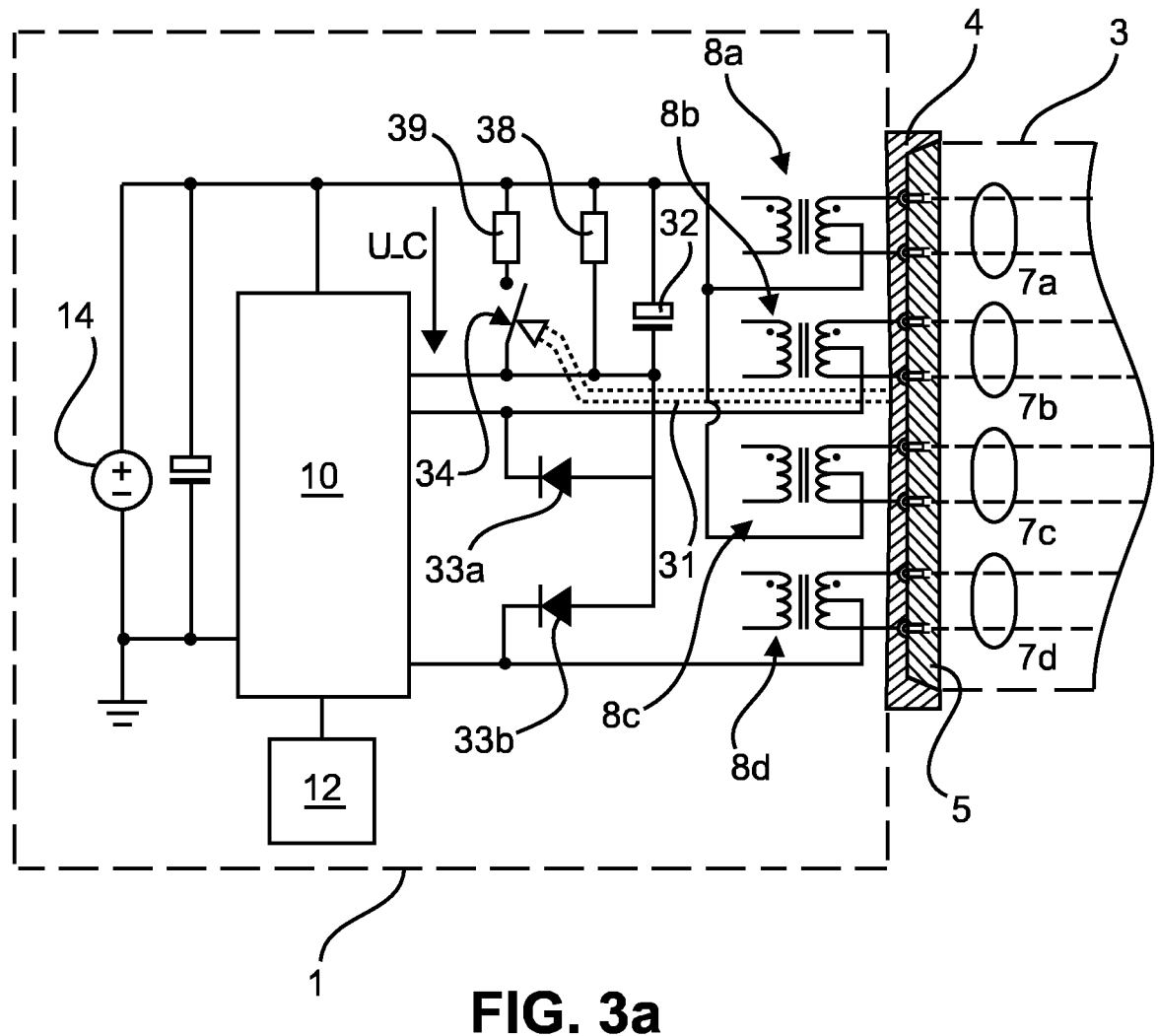
FIG. 3a shows schematically and exemplarily components of an embodiment of the apparatus in which the connection monitoring module includes a mechanical push contact arranged at a socket for connecting the powered device.
Figure 3B:
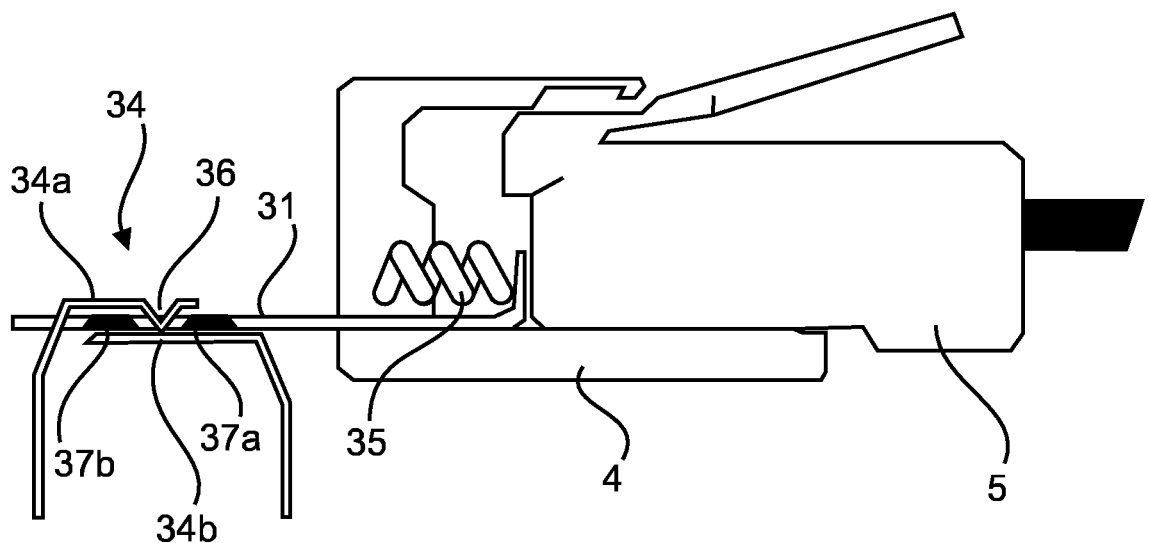
FIG. 3b shows schematically and exemplarily one configuration of the push contact.

In one embodiment schematically and exemplarily illustrated in FIGS. 3a and 3b, the connection monitoring module 13 comprises a mechanical push contact 31 which is arranged at the Ethernet port and which interacts with a capacitor 32 which serves as a memorizing unit for memorizing an interruption of the connection between the PSE 1 and the PD 2 during a power outage.

The capacitor 32 is charged by the power supply 14 while the power supply 14 supplies power to a PD 2 via an Ethernet cable 3. In order to achieve this, the capacitor 32 is connected to the power supply 14 in parallel to the PD 2. Further, the capacitor 32 is coupled to the negative pole of the power supply 14 via diodes 33a and 33b connecting the capacitor to the return paths from the center tabs of the data transformers 8b and 8d. These diodes 33a and 33b prevent a discharge current through the return paths, which would discharge the capacitor 32 during a power outage, i.e. when no power is provided by the power supply 14. In addition, a switch 34 is provided which connects the terminals of the capacitor 32 to each other in case the switch 34 is closed. Thus, the capacitor 32 is short-circuited and discharged, while the switch 34 is closed.

The switch 34 may be coupled to the push contact 32 in such a way that the switch 34 is open when the socket 4 holds a connector 5 and that the switch 34 is being closed when a connector 5 of a network cable 3 is being inserted into and/or unplugged the socket 4 of the Ethernet port. Thus, the capacitor 32 is being discharged when particularly a new connector 5 is being inserted into the socket 4 during a power outage. The discharge rate of the capacitor can be controlled by means of a suitably dimensioned resistor 39 connected in series to the switch 34.

In the embodiment illustrated in FIG. 3*b*, the push contact 31 is configured as a rod or elongated plate which extends from a region at the back side of the socket 4 into the socket 4. The push contact 31 is movably mounted in such a way that it can move between a first position in which one end of the push contact 31 does not extend into the inner of the socket 4 (i.e. the area occupied by a connector plugged into the socket 4) and a second a position in which the push contact 31 extends into the inner of the socket 4 over a predetermined length. Further, the push contact 31 is coupled to a pressure spring element 35, which applies a force pushing the push contact 31 towards the second position in which it extends in to the inner of the socket 4. Thus, the push contact 31 is in the second position, when no connector 5 is inserted into the socket 4. When a connector 5 is being plugged into the socket 4, the push contact 31 is moved to the second position against the force generated by the pressure spring element 31. In the embodiment illustrated in FIG. 3*b*, the pressure spring element 35 is a spring affixed to the end of the push contact 31 extending into the inner of the socket 4. However, the pressure spring element may likewise be configured as another elastic element and/or may be affixed to the push contact in another way.

The switch 34 may be arranged at the back side of the socket 4 and may comprise a first conducting element 34*a* and a second conducting element 34*b*, which may be configured as metal plates, for example. One of the conducting elements 34*a* may have a contacting nose portion 36 which can contact the other conducting element 34*b* and which can be separated from the other conducting element 34*b* against an elastic force. The elastic force may be generated by the conducting element 34*a* comprising the contacting nose portion 36 or by a further element coupled to the conducting element 34*a*.

The push contact 31 disposes of at least one interrupting element 37*a*. This element is made of a non-conducting material. It is affixed to the push contact 31 such that it moves together with the push contact 31 and it is arranged in such a way that it is positioned between the contacting nose portion 36 of the first conducting element 34*a* and the second conducting element 34*b* substantially only when the push contact 31 is in the aforementioned first position (i.e. when a connecter 5 is plugged into the socket 4). When the push contact 31 leaves the first position, the interrupting element 37*a* does no longer separate the contacting nose portion 36 and the second conducting element 34*b*. Thus, the switch 34 is closed and the capacitor is discharged. This is the situation illustrated in FIG. 3*b*.

Hence, the port controller 10 can determine whether a new connector 5 is inserted into the socket 4 during a power outage by measuring the charge of the capacitor 32 at the beginning of a new power cycle. As the insertion of a new connector is indicative of a replacement of the PD 2 connected to the PSE 1, the port controller 10 may judge on the basis of the determination of the charge of the capacitor 32 whether it begins to supply power in accordance with the stored configuration from the previous power cycle or whether it starts the new power cycle with a probing phase.

Upon the beginning of a new power cycle after a power outage, the port controller 10 does particularly determine the voltage U_C over the capacitor 32 using corresponding measuring tabs connecting two terminals of the capacitor 32. The measured voltage is compared to a reference voltage, which corresponds to the voltage over the fully charged capacitor 32 and which may be pre-stored in the port controller 10. If the measured voltage does substantially correspond to the reference voltage, i.e. if the difference between the measured voltage and the reference voltage is below a predefined threshold, no new connector 5 has been inserted into the socket 4 during the power outage. In this case, the port controller substantially immediately controls the power supply 14 to supply power via the Ethernet port to the connected PD 2 in accordance with the configuration of the previous power cycle, which is stored in the memory 12. However, in case the port controller 10 determines that the difference between the measured voltage and the reference voltage exceeds the predefined threshold, the power supply to the PD 2 in the new power cycle is not made on the basis of the configuration stored in the memory 12. Rather, the port controller 10 starts the new power cycle with a probing phase during which the configuration for supplying power in this power cycle is determined.

In addition to the interrupting element 37*a*, the push contact may optionally dispose of a further interrupting element 37*b* which separates the contacting noise portion 36 and the second conducting element 37 substantially only when the push contact 31 is in the aforementioned second position (i.e. when no connector 5 is plugged into the socket 4). In this embodiment, the switch 34 is also open when no connector 5 is plugged into the socket 4 and is only being closed when a connector 5 is being inserted into the socket 4 or removed from the socket 4. The embodiment has the advantage that it is easily possible for the port controller 10 to determine whether a socket that was unused before a power outage is still unused after a power outage.

In case an Ethernet port is not used in one power cycle, the port controller 10 may store a corresponding indication in the memory 12 in this embodiment. At the beginning of a new power cycle after a power outage, the port controller 10 may access the memory and check whether it contains such an indication. If the memory 12 does not include such an indication but comprises information about configuration used for supplying power in the previous power cycle, it proceeds as explained above in order to judge whether or not power is supplied in accordance with the stored configuration in the new power cycle. If the port controller 10 determines that the memory 12 includes an indication that the Ethernet port was not used in the previous power cycle, it also measures the voltage over the capacitor 32 and compares the measured voltage with the reference voltage. In case the difference between the measured voltage and the reference voltage is below a threshold (which may correspond to the aforementioned threshold or which may be a different predefined threshold), no new connector has been inserted into the socket during the power outage. In this case, the port controller 10 does not initiate a power supply via the Ethernet port. If the port controller 10 determines that the difference between the measured voltage and the reference voltage exceeds the threshold, a PD2 has been connected to the Ethernet port during power outage. Therefore, the port controller initiates a new power cycle starting with a probing phase, if the difference between the measured voltage and the reference voltage exceeds the threshold.

In the embodiments explained above, the port controller 10 follows a defined procedure, in which power is supplied in accordance with a stored configuration or in which no power is supplied, in case the voltage across the capacitor 32 does substantially correspond to the reference voltage. As explained, this behavior is especially desired at the beginning of power cycles following short power outages. However, it may be desired that the port controller 10 begins a power cycle in the conventional way on the basis of a probing phase, when the power cycle follows a longer power outage. In order to achieve this, a resistor 38 may optionally be connected in parallel to the capacitor 32 in one embodiment as schematically illustrated in FIG. 3a. The resistor 38 may be dimensioned in such a way that the capacitor 32 is substantially not discharged during short power outages, i.e. power outages having a duration of several ten seconds or several minutes. However, the capacitor 32 may be discharged via the resistor 38 during longer power outages. After such a longer power outage, the port controller 10 will thus determine that the difference between the reference voltage and the voltage measured across the capacitor 32 exceeds the threshold. As a consequence, the port controller 10 will start the power cycle with the probing phase as explained above.

In further embodiments, the connection monitoring module 13 does not comprise a mechanical push contact 31, but monitors the connection between PSE 1 and the PD 2 on the basis of an electrical signal during power outage.

In these embodiments, the connection monitoring module 13 comprises a power source 41 which injects a loop current into at least one of the wire pairs 7i of the Ethernet cable 3, particularly during power outages. The loop current flows to the PD 2 through one wire of the wire pair 7i. Then it flows through the secondary of the data transformer 9i of the PD 2 corresponding to the wire pair 7i and returns to the PD 2 through the other wire of the wire pair 7i. In order to drive the loop current during a power outage, the power source 41 is configured in such a way that it provides power when the power supply 14 for supplying power to the PD 2 is not available. In particular, the power source 41 may be configured as a capacitor which is charged by the power source 14 during a power cycle. During a power outage, the capacitor is being discharged and thereby drives the loop current. In order to allow the capacitor to drive the loop for a sufficiently long time (i.e. during power outages up to a certain duration), the capacity is suitably selected and the discharge rate is suitable configured, e.g. by means of an appropriate resistor. In alternative implementations, it is likewise possible that the power source 41 is configured in another way. For instance, it may comprise a battery driving the loop current during a power outage.

When the PD 2 is disconnected from the PSE 1 during a power outage, the loop current is interrupted. Such an interruption of the loop current leads to change of the state of the memorizing unit integrated into the connection monitoring module. In one implementation, the memorizing unit may be a capacitor which changes from a charged state to an at least partly discharged state due to the interruption of the loop current. The change of the state of the memorizing unit may be detected by the port controller 10 at the beginning of a new power cycle. In case the port controller 10 detects such a state change, the PD 2 has been disconnected from the PSE 1 during the power outage that preceded the power cycle. In this event, the port controller may start the new power cycle with a probing phase. Otherwise, i.e. when the port controller 10 determines that the state of the memorizing unit has not changed, the connection between the PSE 1 and the PD 2 has been maintained during the power outage. In this case, the port controller 10 reads the stored configuration from the previous power cycle from the memory 12 and substantially immediately controls the power source 14 to supply power to the PD 2 in accordance with the stored configuration.

Compared with the aforementioned embodiment including a mechanical push contact 31, the embodiments using a loop current for detecting a disconnection between the PSE 1 and the PD 2 have the advantage that it is also possible to detect such a disconnection in a situation in which the Ethernet cable 3 is not unplugged from the Ethernet port and a new PD 2 is connected to the Ethernet cable.

Figure 4:
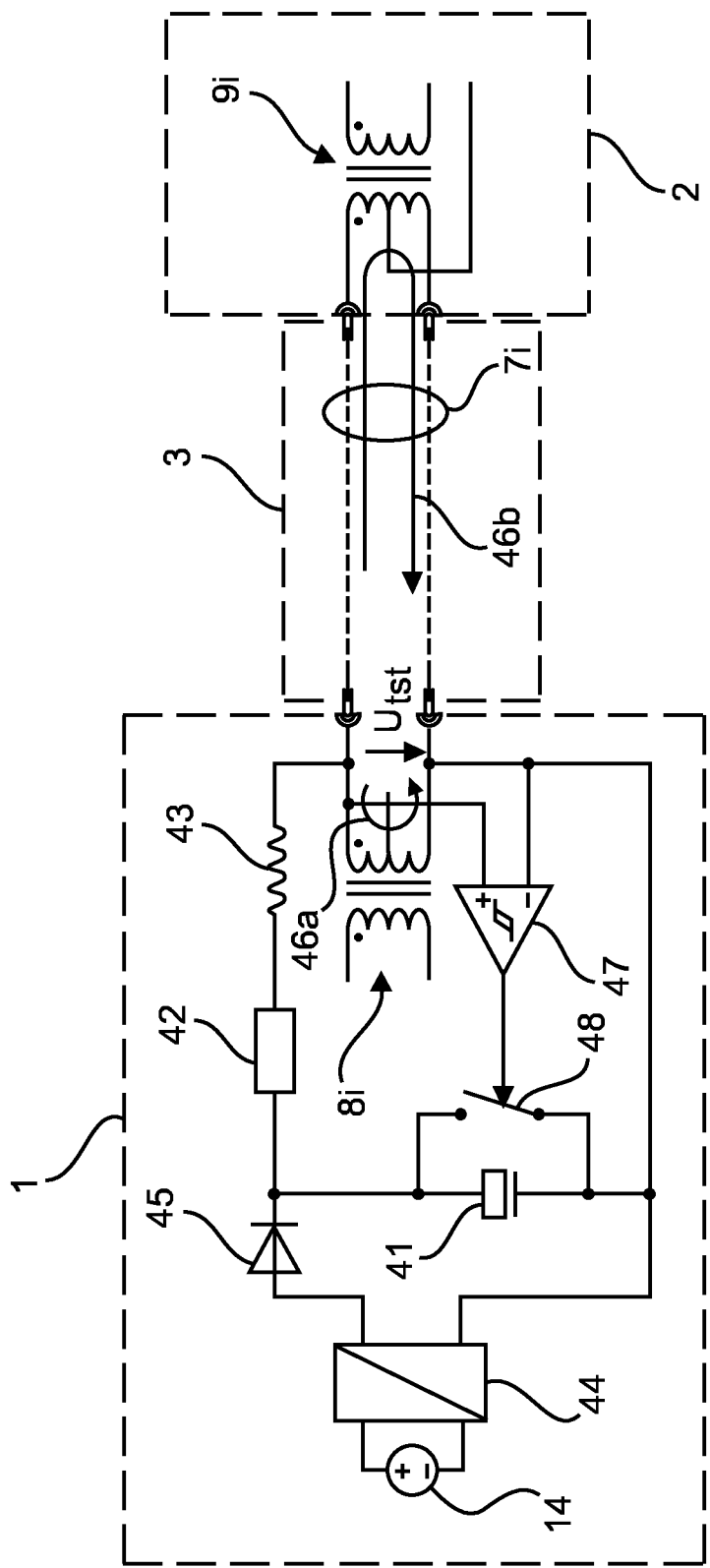
FIG. 4 shows schematically and exemplarily components of a first embodiment of the apparatus in which the connection monitoring module is enabled to provide a loop current flowing between the apparatus and the powered device.

On implementation of an embodiment using a loop current is schematically and exemplarily illustrated in FIG. 4. For facilitating inspection, FIG. 4 does only show the components of the PSE 1 for driving the loop current in one wire pair 7i of the Ethernet cable 3. It does particularly not show the port controller 10 and the other wire pairs 7i of the Ethernet cable. As shown in FIG. 4, the power source 41 may be connected to the terminals of secondary of the data transformer 8i within the PSE 1 in such a way that each wire of the wire pair 7i is coupled to one of the poles of the power source 41. As explained above, the power source 41 may comprise a capacitor and may comprise or be connected in series with a resistor 42 which is dimensioned to ensure a suitable discharge rate of the capacitor during a power outage. In addition, a filter inductor 43 may be connected in series with the power source 41 in order to minimize the influence of the data pulses. The capacitor 41 is charged by the power source 14 during the normal operation of the PSE 1. For this purpose, the capacitor 41 is preferably connected to the power source 14 via an isolated DC/DC converter 44 in order to isolate the capacitor 41 and the Ethernet cable 3 from the power source 14. Moreover, the capacitor 41 is preferably charged via a diode 45 so that the capacitor does not discharge via the DC/DC converter 44 but only via the wire pair 7i.

The capacitor 41 drives a loop current that flows through the secondary of the data transformer 8i of the PSE 1 (current path 46a in FIG. 4) and through the secondary 9i of the data transformer of the PD 2 (current path 46b in FIG. 4). In this current loop, the data transformers 8i and 9i of the PSE 1 and the PD 2 are connected in parallel. The loop current may particularly be a DC current, which does not disturb the transmission of data pulses through the wire pair 7i and the loop current keeps flowing during a power outage. In particular, the loop current keeps flowing for a limited time duration until the capacitor 41 is discharged. For example, the time duration may be some ten seconds or some minutes. When the PD 2 is disconnected from the PSE 1, the loop current does no longer flow through the secondary of the data transformer 9i of the PD 2 but only through the secondary of the data transformer 8i of the PSE 1. Thus, current does only flow through the current path 46a and the current path 46b shown in FIG. 4 does no longer exist. As a consequence, the resistance within the current loop decreases since the secondary of the data transformer 9i does no longer work as resistor, and, thus, the voltage drop U_tst across the secondary of the data transformer 8i of the PSE 1 increases. Assuming that the secondaries of the data transformer 8i of the PSE 1 and of the data transformers 9i of the PD 2 have approximately the same resistance, the voltage drop U_tst does approximately double for short cable lengths (i.e. when the resistance of the Ethernet cable 3 can be neglected).

In the embodiment illustrated in FIG. 4, an amplifying comparator 47 is provided, which measures the voltage drop U_tst across the secondary of the data transformer 8i of the PSE 1 and which detects the increase of the voltage drop in case the PD 2 is disconnected from the PSE 1. For this purpose, the amplifying comparator 47 may compare the voltage drop U_tst across the secondary of the data transformer 8i with a predetermined threshold value which is higher than the voltage drop U_tst when the loop current does only flow through the secondary of the data transformer 8i of the PSE 1 and which is lower than the voltage drop U_tst when the loop current flows through the secondaries of both the data transformers 8i and 9i of the PSE 1 and the PD2. In this implementation, the amplifying comparator 47 may detect the increase of the voltage drop U_tst when the measured voltage U_tst across the secondary of the data transformer 8i is above the predetermined threshold.

When the amplifying comparator 47 detects an increase of the voltage drop resulting from a disconnection of the PD 2 from the PSE 1, it may close a switch 48 to thereby short-circuiting the capacitor 41. Thus, the capacitor 41 is being discharged when the PD 2 is being disconnected from the PSE 1. Thus, the capacitor 41 does also serve as memorizing unit which changes its state (i.e. which is being discharged) when the PD 2 is disconnected from the PSE 1 during a power outage. At the beginning of the next power cycle, the port controller 10 may check whether or not the capacitor 41 is still charged. If the capacitor 41 is still charged, the PD 2 has not been disconnected from the PD 1 and the port controller may provide power to PD 2 in accordance with the stored configuration. Otherwise, i.e. when the capacitor 41 is discharged at the beginning of the next power cycle, the port controller 10 may start the next power cycle with a probing phase.

Figure 5:
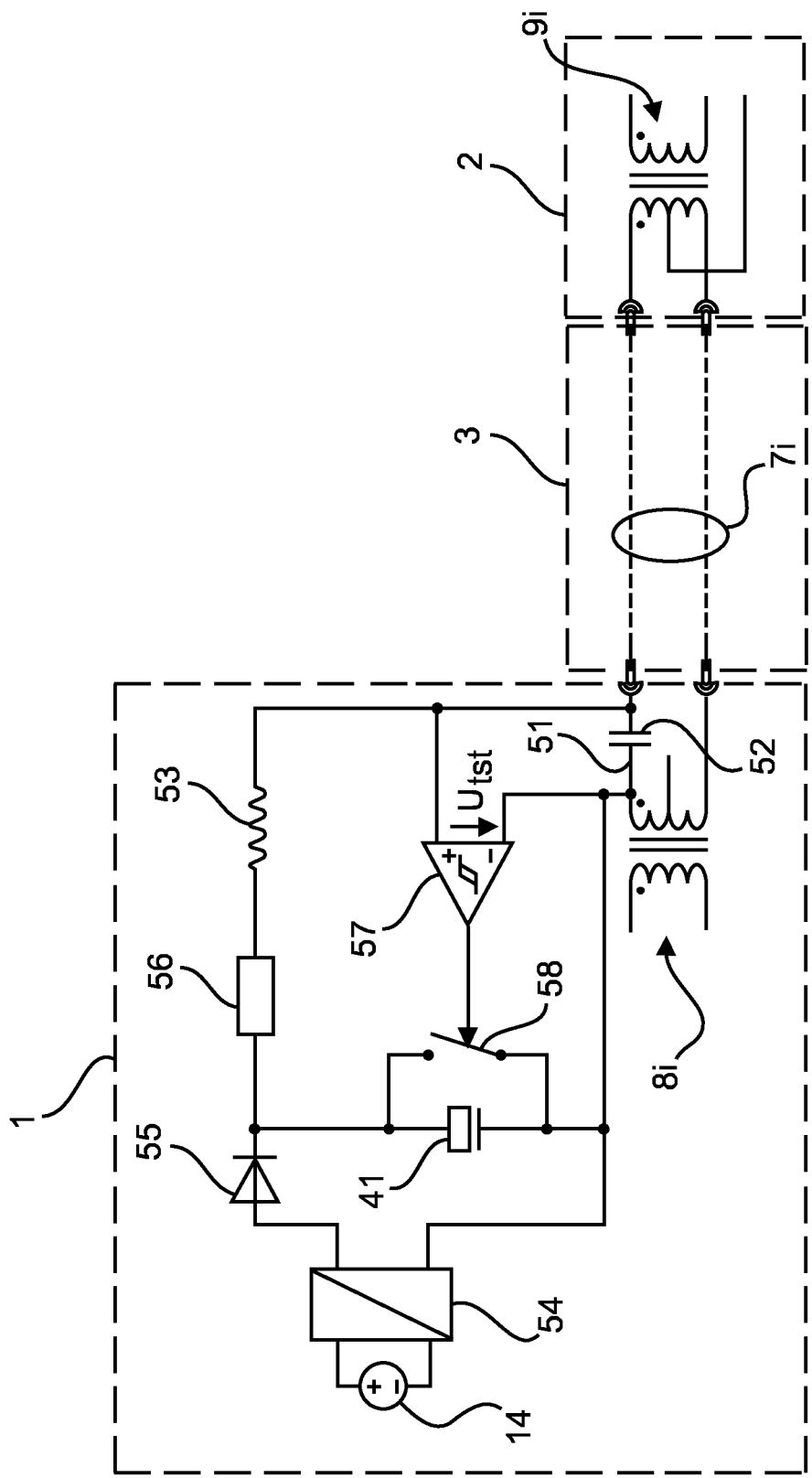
FIG. 5 shows schematically and exemplarily components of a second embodiment of the apparatus in which the connection monitoring module is enabled to provide a loop current flowing between the apparatus and the powered device.

A further implementation is schematically and exemplarily illustrated in FIG. 5. For facilitating inspection, this figure does likewise show only components of the PSE 1, which are relevant for driving the loop current. In the implementation shown in the figure, the secondary of the data transformer 8i of the PSE 1 and the secondary of the data transformer 9i of the PD 2 are connected in series in the loop current path. In order to achieve this, the power source 41, which may be configured as explained above, is connected in parallel to one terminal wire 51 of the data transformer 8i which is connected to one wire of the wire pairs 7i of the Ethernet cable 3. In the implementation illustrated in FIG. 5, the power source 41 is again configured as a capacitor which is charged by means of the power supply 14 of the PSE 1 via an isolated DC/DC converter 54 and a diode 55. Similar to the embodiment explained before, a resistor 56 is connected in series to the capacitor 41 in the loop current path in order to ensure a suitable discharge rate of the capacitor 41 during a power outage. Further, a filter inductor 53 is preferably connected in series to the capacitor 41 in order to isolate the capacitor 41 from the data pulses transmitted via the wire pair 7i. In the terminal wire 51, a filter capacitor 52 is preferably inserted, which is connected in parallel to the power source 41. The filter capacitor 52 prevents that the capacitor 41 is short-circuited via the terminal wire 51 and can be passed by the alternating data pulses transmitted via the wire pair 7i.

In this implementation, a loop current, which may particularly be a DC current, flows through the secondary of the data transformer 8i of the PSE 1, the secondary of the data transformer 9i of the PD 2 and the wire pair 7i of the Ethernet cable 3. In particular, the loop current keeps flowing during a power outage. When the PD 2 is disconnected from the PSE 1, the loop current stops flowing. This does particularly lead to an increase of the voltage U_tst across the filter capacitor 52. So, the voltage U_tst across the filter capacitor 52 corresponds to the voltage drop across the secondaries of the data transformers 8i and 9 and the Ethernet cable 3 in the current loop. When the loop current stops flowing the voltage U_tst does approximately correspond to the voltage across the capacitor 41 which is significantly larger as long as the capacitor 41 is still sufficiently charged. Thus, an increase of the voltage U_tst across the filter capacitor 52 is indicative of a situation in which the PD 2 is disconnected from the PSE 1.

In the implementation illustrated in FIG. 5, an amplifying comparator 57 is again provided, which measures the voltage U_tst across the filter capacitor 52 and which detects the increase of the voltage U_tst in case the PD 2 is disconnected from the PSE 1. In particular, the amplifying comparator 57 may compare the voltage U_tst across the filter capacitor with a predetermined threshold value which is set higher than the voltage U_tst when the loop current is flowing and which is lower than the voltage across the capacitor 41. In this regard, the threshold is preferably set in such a way that it is also lower than the capacitor voltage when the capacitor 41 is partly discharged. The amplifying comparator 57 may detect the increase of the voltage U_tst resulting from an interruption of the loop current, when the measured voltage U_tst across the filter capacitor 52 is above the predetermined threshold.

When the amplifying comparator 47 detects an increase of the voltage U_tst resulting from an interruption of the loop current, it may close a switch 58 to thereby short-circuiting the capacitor 41. Thus, the capacitor 41 is being discharged when the PD 2 is being disconnected from the PSE 1. Hence, the capacitor 41 does again serve as memorizing unit which changes its state (i.e. which is being discharged) when the PD 2 is disconnected from the PSE 1 during a power outage. At the beginning of the next power cycle, the port controller 10 may provide power to the PD 2 in accordance with the stored configuration or may start a probing phase based on the state of charge of the capacitor as already explained in connection with the embodiment illustrated in FIG. 4.

In the aforementioned embodiments, the port controller 10 can determine on the basis of the state of charge of the capacitor 41 whether the PD 2 has been disconnected from the PSE 1 particularly during shorter power outages. During longer power outages, the capacitor 41 is also being discharged via the loop current when the connection between the PD 2 and the PSE 1 is maintained. Thus, after a longer power outage the port controller 10 starts the new power cycle with a probing phase. The minimum duration of such a "longer" power outage after which a new power cycle is started with a probing phase can particularly be set by suitably dimensioning the capacitor 41 and the resistor 42 or 56 and suitably setting the threshold values applied in the comparator 47 or 57.

Further, the aforementioned embodiments of the connection monitoring module can also be used for monitoring the connection between the PSE 1 and the PD 2 during the normal operation of the PSE 1. So, the discharging of the capacitor 41 in case the PD 2 is disconnected from the PSE 1 causes an increased power transfer to the capacitor 41 through the DC/DC converter 44 or 54. Such an increase of the power transferred to the capacitor 41 may be detected by the port controller 10. When the port controller 10 detects such an increased power transfer, it may determine that the PD 2 is disconnected from the PSE 1 and may control the power source 14 to stop supplying power via the network port.

As explained above, the loop current may be a DC current in the implementations illustrated in FIGS. 4 and 5. In other variants, the current may be an AC current. The AC current does preferably have a relatively low frequency which ensures that the loop current does not interfere with the data signals transmitted via the wire pair 7i. When the connection monitoring module 13 injects an AC loop current, it is possible to connect the power source 41 at the primary of the data transformer 8i at which the data signal arrives instead of the secondary side connected to the Ethernet cable 3. In this case, the injected AC current is transferred by the data transformer 8*i* to the loop including the secondaries of the data transformers 8*i* and 9*i* and the wire pair 7*i* of the Ethernet cable. Compared with the aforementioned embodiments in which a DC current is injected at the secondary side of the data transformer 8*i*, the injection of an AC current at the primary side has the advantage that no separate isolation from the power source 14 is required. Thus, the isolated DC/DC converters used in the aforementioned embodiments can be dispensed with. Moreover, the test current can be generated in the chip for decoding the data (so called PHY chip) and no separate circuitry for generating and injecting the test current is required.

While the invention has been described above particularly in connection with an Ethernet connection and a PoE mechanism, the invention is not so limited and my likewise be applied in connection with other wired data connections. In particular, the invention may be applied in connection with an USB connection and a mechanism for supplying power via an USB data link. Such a mechanism may particularly be the USB Power Delivery (USB-PD) mechanism which is known to the person skilled in the art in principle. In accordance with this mechanism, a so called Power Delivery contract is negotiated between a PSE 1 and a PD 2, which defines a configuration for providing power from the PSE 1 to the PD 2 via the USB connection. Within the scope of the present invention, a USB port controller may store the contract used during a power cycle and may control a power source to provide power in accordance with the stored contract in the next power cycle after a power outage. Thus, a further negotiation of the contract at the beginning of the power cycle can be dispensed with. In particular, power may be supplied in accordance with the stored contract when it has been determined that the PD 2 has not been disconnected from the PSE 1 during the power outage. Within the context of an USB connection, this determination may be made in a similar way as discussed before in connection with an Ethernet connection.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus enabled to provide power to a powered device via a wired data link for connecting the apparatus and the powered device,
the apparatus being configured to provide the power to the powered device in accordance with a configuration determined based on at least one parameter transmitted by the powered device via the wired data link during a probing phase in a first power cycle,
wherein the apparatus comprises:
a memory for storing an information about the configuration,
a controller for controlling the apparatus on the basis of the stored information to provide power to the powered device in a subsequent power cycle after a power outage in accordance with the configuration determined based on the at least one parameter transmitted by the powered device via the wired data link during the probing phase in the first power cycle, such that the probing phase is dispensed with in the subsequent power cycle, and
a connection monitoring module for detecting an interruption of the connection between the apparatus and the powered device during the power outage, the connection monitoring module comprising:
a push contact arranged at a socket for receiving a connector to establish the wired data link to the powered device, the push contact being in a first position when the connector is plugged into the socket and being in a second position when no connector is plugged into the socket, and a memorizing unit for memorizing a movement of the push contact from the first to the second position and/or from the second to the first position during the power outage.

2. The apparatus as defined in claim 1, wherein the controller is configured to control the apparatus to provide power to the powered device on the basis of the stored information after the power outage, if the connection monitoring module has not detected an interruption of the connection between the apparatus and the powered device during the power outage.

3. The apparatus as defined in claim 1, wherein the connection monitoring module comprises a power source to provide a test current flowing in a current loop through the wired data link and the powered device and the connection monitoring module comprising a memorizing unit for memorizing an interruption of the current loop during the power outage.

4. The apparatus as defined in claim 3, wherein the controller is configured to control the apparatus to provide power to the powered device on the basis of the stored information after the power outage, if the memorizing unit does not indicate an interruption of the current loop during the power outage.

5. The apparatus as defined in claim 3, wherein the power source comprises a capacitor being charged by means of the power provided by the apparatus to power the powered device.

6. The apparatus as defined in claim 3, wherein the memorizing unit comprises a capacitor being discharged in response to an interruption of the current loop.

7. The apparatus as defined in claim 3, wherein the power source corresponds to the memorizing unit.

8. The apparatus as defined in claim 1, wherein the controller is configured to control the apparatus to provide power to the powered device on the basis of the stored information after the power outage, if the memorizing unit does not indicate a movement of the push contact from the first to the second position and/or from the second to the first position during the power outage.

9. The apparatus as defined in claim 1, wherein the memorizing unit comprises a capacitor being discharged in response to a movement of the push contact from the first to the second position and/or in response to a movement of the push contact from the second to the first position.

10. The apparatus as defined in claim 9, wherein the capacitor is charged by means of the power provided by the apparatus to power the powered device.

11. The apparatus as defined in claim 1, wherein the wired data link includes an Ethernet link and wherein the apparatus is configured to provide power to the powered device in accordance with a Power over Ethernet mechanism.

12. A method for operating an apparatus enabled to provide power to a powered device via a wired data link for connecting the apparatus and the powered device, the method comprising:

provide the power to the powered device in accordance with a configuration determined based on at least one parameter transmitted by the powered device via the wired data link during a probing phase in a first power cycle, storing an information about the configuration in a memory of the apparatus;

controlling the apparatus on the basis of the stored information to provide power to the powered device in a subsequent power cycle following a power outage in accordance with the configuration determined based on the at least one parameter transmitted by the powered device via the wired data link during the probing phase in the first power cycle, such that the probing phase is dispensed with in the subsequent power cycle; and detecting an interruption of the connection between the apparatus and the powered device during the power outage, the detecting comprising:

receiving a connector, by a push contact arranged at a socket, to establish the wired data link to the powered device, the push contact being in a first position when the connector is plugged into the socket and being in a second position when no connector is plugged into the socket, and memorizing a movement of the push contact from the first to the second position and/or from the second to the first position during the power outage.

13. A non-transitory computer-readable medium comprising computer program code executable in a processing unit of an apparatus enabled to provide power to a powered device via a wired data link for connecting the apparatus and the powered device, the computer program code, when executed in the processing unit, causing the processing unit to carry out a method comprising:

providing the power to the powered device in accordance with a configuration determined based on at least one parameter transmitted by the powered device via the wired data link during a probing phase in a first power cycle, storing an information about the configuration in a memory of the apparatus;

controlling the apparatus on the basis of the stored information to provide power to the powered device in a subsequent power cycle following a power outage in accordance with the configuration determined based on the at least one parameter transmitted by the powered device via the wired data link during the probing phase in the first power cycle, such that the probing phase is dispensed with in the subsequent power cycle; and detecting an interruption of the connection between the apparatus and the powered device during the power outage, the detecting comprising:

receiving a connector, by a push contact arranged at a socket, to establish the wired data link to the powered device, the push contact being in a first position when the connector is plugged into the socket and being in a second position when no connector is plugged into the socket, and memorizing a movement of the push contact from the first to the second position and/or from the second to the first position during the power outage.

\* \* \* \* \*